US012015881B2

(12) United States Patent
Ogino (10) Patent No.: US 12,015,881 B2
(45) Date of Patent: *Jun. 18, 2024

(54) LIGHT SOURCE APPARATUS INCLUDING A MICROLENS ARRAY, PROJECTOR INCLUDING A MICROLENS ARRAY, MICROLENS ARRAY, AND LIGHT SOURCE CONTROL METHOD FOR THE LIGHT SOURCE APPARATUS INCLUDING THE MICROLENS ARRAY

(71) Applicant: CASIO COMPUTER CO., LTD., Tokyo (JP)

(72) Inventor: Hiroshi Ogino, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,328

(22) Filed: Mar. 15, 2023

(65) Prior Publication Data

US 2023/0213847 A1 Jul. 6, 2023

Related U.S. Application Data

(63) Continuation of application No. 17/476,624, filed on Sep. 16, 2021, now Pat. No. 11,632,526.

(30) Foreign Application Priority Data

Sep. 17, 2020 (JP) ................................ 2020-155946

(51) Int. Cl.
*H04N 9/31* (2006.01)
*G02B 27/09* (2006.01)
(Continued)

(52) U.S. Cl.
CPC ....... *H04N 9/3152* (2013.01); *G02B 27/0961* (2013.01); *G03B 21/005* (2013.01); *G03B 21/208* (2013.01); *G03B 21/008* (2013.01)

(58) Field of Classification Search
CPC .. G03B 21/005; G03B 21/006; G03B 21/008; G03B 21/28; G03B 21/208;
(Continued)

(56) References Cited

U.S. PATENT DOCUMENTS 6,246,526 B1 * 6/2001 Okuyama ............ G02B 27/285
349/5
9,946,140 B2 * 4/2018 Miyasaka ............ G03B 21/005
(Continued)

FOREIGN PATENT DOCUMENTS

JP 2000098488 A 4/2000
JP 2002116501 A 4/2002
(Continued)

OTHER PUBLICATIONS

Office Action dated Aug. 16, 2022 received in U.S. Appl. No. 17/476,624.
(Continued)

*Primary Examiner* — Sultan Chowdhury
(74) *Attorney, Agent, or Firm* — SCULLY SCOTT MURPHY & PRESSER, PC (57) ABSTRACT

A light source apparatus includes a light source, a light collection optical system configured to collect a pencil of light emitted from the light source using multiple lenses, a microlens array formed into a size corresponding to a collected light diameter of a pencil of light collected by the light collection optical system and caused to be incident thereon from the light collection optical system, and a display device on to which light transmitted through the microlens array to be superimposed together is incident.

20 Claims, 8 Drawing Sheets

(51) Int. Cl.
*G03B 21/00* (2006.01)
*G03B 21/20* (2006.01)

(58) Field of Classification Search
CPC ............ G03B 21/2053; G03B 21/2066; G02B 27/095; G02B 27/0927; G02B 27/09433; G02B 27/0944; G02B 27/0961; G02B 27/0966; G02B 27/0977; G02B 27/1026; G02B 27/1033; H04N 9/315; H04N 9/317; H04N 9/3102; H04N 9/3126; H04N 9/3152; H04N 9/3155
See application file for complete search history.

(56) References Cited

U.S. PATENT DOCUMENTS

| | | | |
|---|---|---|---|
| 11,275,237 B2 | 3/2022 | Brick et al. | |
| 11,378,878 B2 | 7/2022 | Nakamura | |
| 2002/0039157 A1* | 4/2002 | Nakanishi | G02B 3/0031 |
| | | | 349/95 |
| 2014/0168971 A1* | 6/2014 | Kurosaki | G03B 21/208 |
| | | | 362/235 |
| 2015/0063777 A1* | 3/2015 | Letke | A42B 1/245 |
| | | | 386/224 |
| 2017/0242266 A1* | 8/2017 | Otani | G02B 19/0014 |
| 2018/0373133 A1* | 12/2018 | Miyazaki | G03B 21/2066 |
| 2020/0252589 A1* | 8/2020 | Akiyama | H04N 9/3164 |
| 2021/0041699 A1* | 2/2021 | Ukai | H04N 5/64 |

FOREIGN PATENT DOCUMENTS

| | | |
|---|---|---|
| JP | 2009192789 A | 8/2009 |
| JP | 2013167748 A | 8/2013 |
| JP | 2014102382 A | 6/2014 |
| JP | 2015184401 A | 10/2015 |
| JP | 2019028333 A | 2/2019 |

OTHER PUBLICATIONS

Notice of Reasons for Refusal dated Oct. 6, 2022 received in Japanese Patent Application No. JP 2020-155946.
Notice of Allowance dated Dec. 15, 2022 received in U.S. Appl. No. 17/476,624.

* cited by examiner

LIGHT SOURCE APPARATUS INCLUDING A MICROLENS ARRAY, PROJECTOR INCLUDING A MICROLENS ARRAY, MICROLENS ARRAY, AND LIGHT SOURCE CONTROL METHOD FOR THE LIGHT SOURCE APPARATUS INCLUDING THE MICROLENS ARRAY

CROSS-REFERENCE TO RELATED APPLICATION

This application is a continuation application of U.S. application Ser. No. 17/476,624 filed on Sep. 16, 2021, which claims the benefit of priority under 35 USC 119 from Japanese Patent Application No. 2020-155946 filed on Sep. 17, 2020, the entire disclosure of which, including the specification, claims, drawings and abstract, is incorporated herein by reference.

BACKGROUND OF THE INVENTION

Field of the Invention

The present invention relates to a light source apparatus, a projector, a microlens array, and a light source control method.

Description of the Related Art

There have been proposed heretofore projectors for displaying color images on a screen by collecting light emitted from a light source on to a micromirror display device called a digital micromirror device (DMD) or a display device such as a liquid crystal panel or the like. For example, Japanese Patent Laid-Open No. 2000-98488 (JP-A-2000-98488) discloses a projector (an illumination optical device) including a light source lamp, a first lens array made up of multiple collective lenses and configured to collect light emitted from a light source to thereby form multiple images, a second lens array made up of multiple collective lens and placed near multiple images formed by the first lens array, and a collective lens system configured to collect multiple images that have passed through the first lens array and the second lens array in such manner that the multiple images are superimposed one on another in the same position.

SUMMARY OF THE INVENTION

According to an aspect of the present invention, there is provided a light source apparatus including a light source, multiple lenses configured to collect light emitted from the light source, a microlens array formed into a size corresponding to a collected light diameter of the light collected by the multiple lenses and caused to be incident from the multiple lenses, and a display device on to which light transmitted through the microlens array to be superimposed together is incident.

According to an aspect of the present invention, there is provided a projector including a light source, multiple lenses configured to collect light emitted from the light source, a microlens array formed into a size corresponding to a collected light diameter of the light collected by the multiple lenses and caused to be incident thereon from the multiple lenses, a display device configured to form image light by light transmitted through the microlens array to be superposed together being incident thereon, a projection optical system configured to project the image light, and a control unit configured to control the light source and the display device.

According to an aspect of the present invention, there is provided a microlens array formed into a size corresponding to a collected light diameter of light collected by multiple lenses and caused to be incident thereon from the multiple lenses and configured to be incident light transmitted therethrough on to a display device in a superimposed fashion.

According to an aspect of the present invention, there is provided a light source control method for a light source apparatus including a light source, multiple lenses, a microlens array formed into a size corresponding to a collected light diameter of light collected by the multiple lenses and caused to be incident thereon from the multiple lenses, a display device, and a control unit configured to control the light source and the display device, wherein the control unit causes the multiple lenses to collect the light emitted from the light source and causes light transmitted through the microlens array to be superimposed together to be shined on to the display device.

BRIEF DESCRIPTION OF THE DRAWINGS

FIG. 7 shows schematic plan views showing portions of the internal structure of the projector according to modified examples of the embodiment of the present invention, in which FIG. 7A shows Modified Example 1, FIG. 7B shows Modified Example 2, and FIG. 7C shows Modified Example 3.

DESCRIPTION OF THE EMBODIMENT

Figure 1:
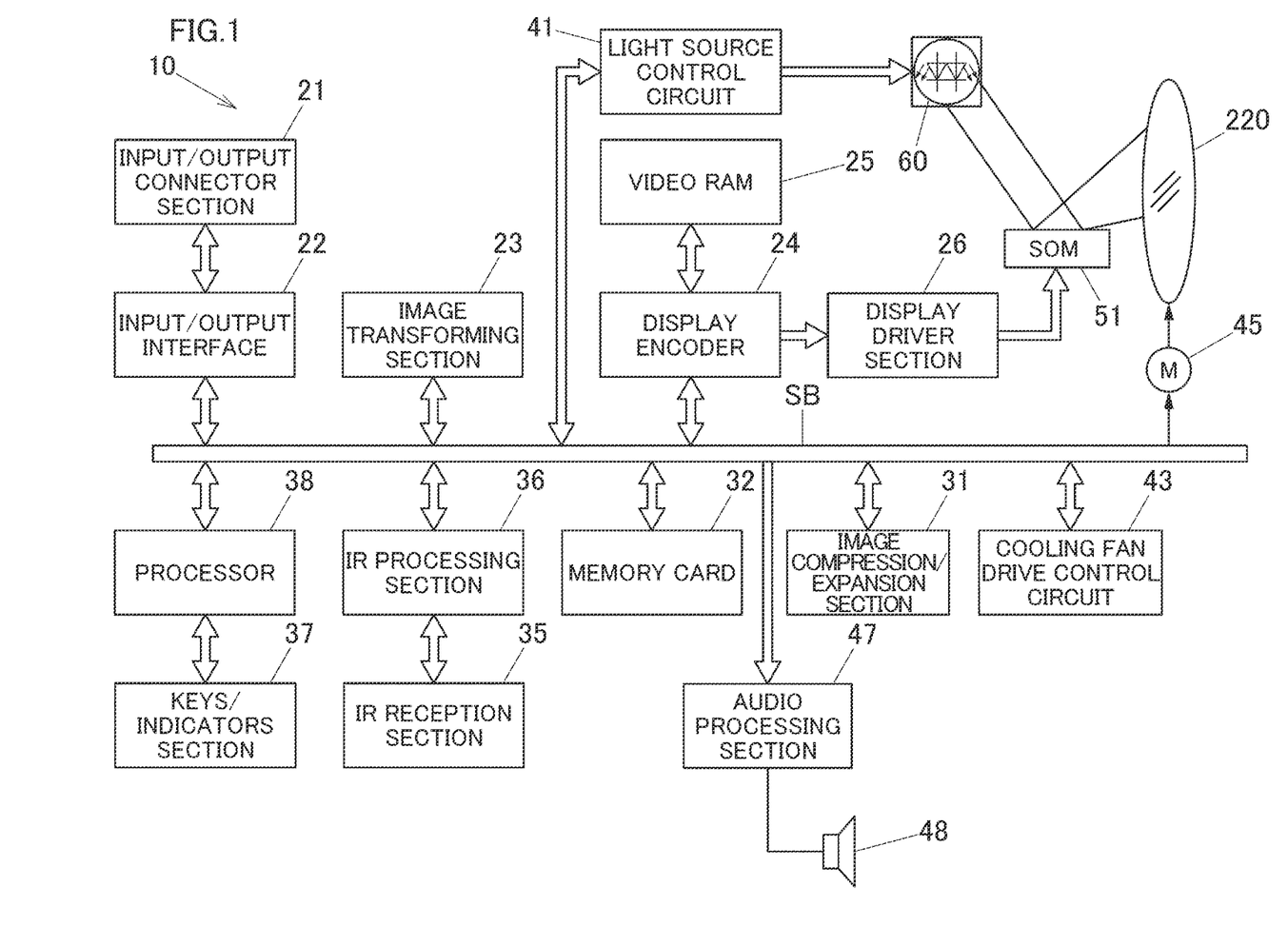
FIG. 1 is a block diagram showing functional circuitry blocks of a projector according to an embodiment of the present invention.

Hereinafter, an embodiment of the present invention will be described. FIG. 1 is a block diagram showing functional circuitry blocks of a projector control unit of a projector 10. The projector control unit is made up of a central processing unit (CPU) including an image transforming section 23 and a processor 38, a front-end unit including an input/output interface 22, and a formatter unit including a display encoder 24 and a display drive section 26. Image signals of various standards which are input from an input/output connector section 21 are sent to the image transforming section 23 via the input/output interface 22 and a system bus SB, and the image signals so sent are then transformed so as to be unified into an image signal of a predetermined format which is suitable for display in the image transforming section 23.

Thereafter, the unified image signal of the predetermined format is output to the display encoder 24.

The display encoder 24 deploys the image signal input thereinto on a video RAM 25 for storage therein and then generates a video signal from the stored contents of the video RAM 25, outputting the video signal so generated to the display drive section 26.

The display drive section 26 drives a display device 51, which is a spatial optical modulator (SOM), at an appropriate frame rate in response to the image signal output from the display encoder 24. The display device 51 is a mirror device for forming image light by reflecting light incident thereon with multiple micromirrors.

Then, the projector 10 is such that lights emitted from a light source apparatus 60 are shined onto the display device 51 via a light collection optical system 140, whereby an optical image is formed by the lights reflected by the display device 51. The optical image so formed is then projected via a projection optical system 220 (refer to FIG. 2) on to a projection target member such as a screen, not shown, for display on the screen. A movable lens group 235 of the projection optical system 220 can be driven using a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman coding and the like, and the compressed data is sequentially written on a memory card 32, which is a detachable recording medium.

Further, with the projector 10 set in a reproducing mode, the image compression/expansion section 31 can read out the image data recorded in the memory card 32 and expands the individual image data that makes up a series of dynamic images frame by frame. Then, the image compression/expansion section 31 executes a process in which the image compression/expansion section 31 outputs the image data to the display encoder 24 by way of the image transforming section 23 so as to enable the display of dynamic images or the like based on the image data stored in the memory card 32.

The processor 38 governs the control of operations of individual circuitries inside the projector 10 and is configured of CPU, a read only memory (ROM) for fixedly storing operation programs such as various settings or the like, RAM used as a work memory, and the like.

Operation signals of a keys/indicators section 37, which is configured of main keys, indicators, and the like which are provided on an upper panel of a housing of the projector 10, are sent out directly to the processor 38. Key operation signals from a remote controller are received by an IR reception section 35, and a code signal, which is demodulated in an Ir processing section 36, is output to the processor 38.

The processor 38 is connected with an audio processing section 47 by way of the system bus SB. This audio processing section 47 includes a circuitry for a sound source such as a PCM sound source or the like. With the projector 10 set in a projection mode and the reproducing mode, the audio processing section 47 converts audio data into analog signals and drives a speaker 48 so as to output sound or voice loudly.

In addition, the processor 38 controls a light source control circuit 41, which functions as a light source processor. The light source control circuit 41 can control operations of the light source apparatus 60, which includes an excitation light shining device 70, a red light source device 120, a luminescent wheel device 100, and the like, all of which will be described later, so as to enable the light source apparatus 60 to emit lights in predetermined wavelength ranges required in generating an image.

Figure 2:
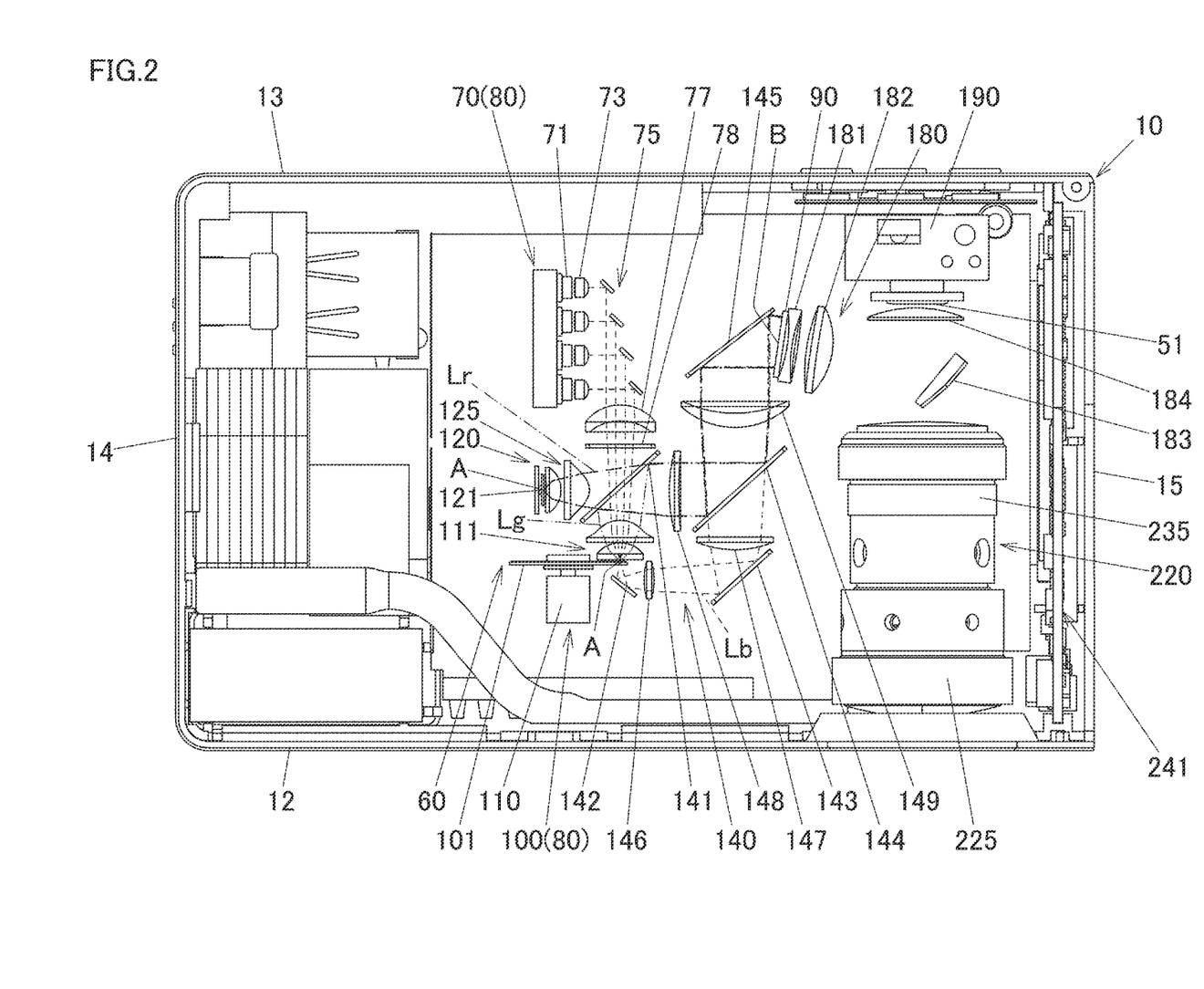
FIG. 2 is a schematic plan view showing an internal structure of the projector according to the embodiment of the present invention.

Next, an internal structure of the projector 10 will be described. FIG. 2 is a schematic plan view showing an internal structure of the projector 10. Here, this projector 10 has a substantially box-shaped housing, which includes a front panel 12, a back panel 13, a right panel 14, and a left panel 15. In the following description, when a left-right direction is referred to in relation to the projector 10, it denotes a left-right direction with respect to a projecting direction, whereas when a front-rear direction is referred to in relation to the projector 10, it denotes a direction towards a screen or a front-rear direction with respect to a traveling direction of light.

The projector 10 includes a control circuit board 241 disposed in the vicinity of the left panel 15. This control circuit board 241 includes a power supply circuit block, a light source control block, and the like. Additionally, the projector 10 includes the light source apparatus 60, which is disposed substantially at a central portion of the housing of the projector 10. Further, a light guiding optical system 180 and the projection optical system 220 are disposed between the light source apparatus 60 and the left panel 15.

The light source apparatus 60 includes the excitation light shining device 70, which constitutes a light source of light Lb having a wavelength in the blue wavelength range or simply blue wavelength range light Lb and excitation light, a red light source device 120, which constitutes a light source of light Lr having a wavelength in the red wavelength range or simply red wavelength range light Lr, and a green light source device 80, which constitutes a light source of light Lg having a wavelength in the green wavelength range or simply green wavelength range light Lg. The green light source device 80 is made up of the excitation light shining device 70 and a luminescent wheel device 100. In addition, the light source apparatus 60 includes a light collection optical system 140, which is disposed therein so as to guide blue wavelength range light Lb, green wavelength range light Lg, and red wavelength range light Lr. The light collection optical system 140 includes a first collective lens group 111 and a second collective lens group 125, which are each made up of multiple lenses, as well as a blue light optical path side collective lens 146, a first collective lens 147, a second collective lens 148, and a third collective lens 149. The light collection optical system 140 collects lights emitted from the blue, green, and red light source devices (the excitation light shining device 70, the green light source device 80, and the red light source device 120) to an entrance port of a microlens array 90.

The excitation light shining device 70 is disposed substantially at a central portion in a left-right direction of the housing of the projector 10 and closer to the back panel 13. The excitation light shining device 70 includes a light source group made up of blue laser diodes 71, a reflection mirror group 75, an excitation light optical path side collective lens 77, a diffuse plate 78, and the like. The light source group is made up of multiple blue laser diodes 71, which are semiconductor light emitting elements, and the multiple blue laser diodes 71 are disposed in such a manner that their optical axes are substantially parallel to the back panel 13. The reflection mirror group 75 changes the directions of axes of lights emitted individually from the blue laser diodes 71 through about 90 degrees towards the front panel 12. Lights in the blue wavelength range emitted from the blue laser diodes 71 are collected by the excitation light optical path side collective lens 77 and are then diffused by the diffuse plate 78 so as to be guided towards the first collective lens group 111.

The blue laser diodes 71, which make up the light source group, are arranged into a matrix configuration of two rows and four columns. A collimator lens 73 is disposed on an optical axis of each blue laser diode 71 to convert light emitted from that blue laser diode 71 into parallel light so as to enhance the directivity of the emitted light. The reflection mirror group 75 is such that multiple reflection mirrors are arranged like steps of a staircase and are integrated into a mirror base plate, which is not shown, in such a manner as to be adjusted in position relative to the mirror base plate, so that the reflection mirror group 75 emits excitation light emitted from the blue laser diodes 71 while narrowing sectional areas of the excitation light in one direction.

The red light source device 120 includes a red light emitting diode 121, which is disposed in such a manner that an optical axis thereof becomes parallel to those of the blue laser diodes 71, and the second collective lens group 125, which is configured to collect light emitted from the red light emitting diode 121. This red light emitting diode 121 is a red light emitting diode which is a semiconductor light emitting element for emitting red wavelength range light Lr. Then, the red light source device 120 is disposed in such a manner that an axis of red wavelength range light Lr emitted from the red light source device 120 intersects an axis of blue wavelength range light Lb emitted from the excitation light shining device 70 and an axis of green wavelength range light Lg emitted form a luminescent wheel 101. The second collective lens group 125 has two planoconvex lenses each having a convex surface on a side from which red wavelength range light Lr is caused to emerge. Further, the red light source device 120 includes a heat sink and a cooling fan (not shown), so that the red light emitting diode 121 can be cooled by the heat sink and the cooling fan. In addition, a red laser diode may be disposed in place of the red light emitting diode 121.

The luminescent wheel device 100, which makes up the green light source device 80, is disposed on an optical path of excitation light emitted from the excitation light shining device 70 and in the vicinity of the front panel 12. The luminescent wheel device 100 includes the luminescent wheel 101, which is disposed in such a manner as to be parallel to the front panel 12 (in other words, in such a manner as to be at right angles to an axis of light emitted from the excitation light shining device 70), a motor 110 for driving to rotate the luminescent wheel 101, a drive control device, not shown, for controlling the driving of the motor 110, and the first collective lens group 111 configured not only to collect excitation light emitted from the excitation light shining device 70 on to the luminescent wheel 101 but also to collect green wavelength range light Lg emitted from the luminescent wheel 101 towards the back panel 13. The first collective lens group 111 has two planoconvex lenses each having a convex surface on a side on which blue wavelength range light Lb is incident (that is, a side from which green wavelength range light Lg is caused to emerge). The drive control device is controlled by the light source control circuit 41.

Figure 3:
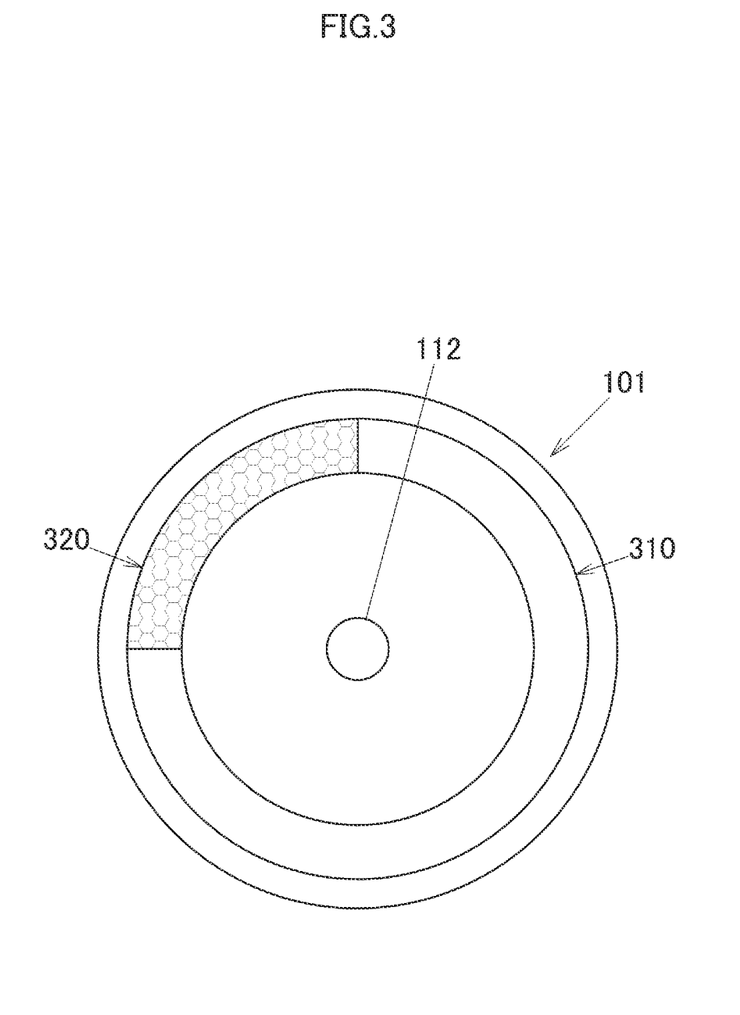
FIG. 3 is a schematic plan view of a luminescent wheel according to the embodiment of the present invention.

The luminescent wheel 101 shown in FIG. 3 has a circular disc shape and can rotate by being driven by the motor 110 which is connected thereto via a bearing 112. The luminescent wheel 101 has, as multiple light source segments, a luminescent light emitting area 310 and a transmission area 320 which are provide end to end in a circumferential direction. A base of the luminescent wheel 101 can be made of a metallic base material such as copper, aluminum, and the like. A surface of this base which faces the excitation light shining device 70 is mirror finished through silver deposition or the like. A green luminescent material layer, which is formed on the mirror finished surface, is formed on the luminescent light emitting area 310. The luminescent light emitting area 310 receives blue wavelength range light Lb from the excitation light shining device 70 as excitation light and then emits therefrom luminescent light in the green wavelength range (green wavelength range light Lg) in every direction. This green wavelength range light Lg is incident on the first collective lens group 111, which is disposed on a side of the luminescent wheel device 100 which faces a first dichroic mirror 141, from the luminescent wheel device 100.

In addition, the transmission area 320 of the luminescent wheel 101 can be formed by fitting a transparent base having light transmitting properties in a cut-out portion formed in the base of the luminescent wheel 101. The transparent base is formed of a transparent material such as glass or resin. Additionally, a diffuse layer may be provided on the transparent base on a side on to which blue wavelength range light Lb is shined or a surface opposite thereto. The diffuse layer can be provided by, for example, forming minute irregularities on the relevant surface of the transparent base through sandblasting or the like. The blue wavelength range light Lb from the excitation light shining device 70 that is incident on the transmission area 320 is transmitted or diffuse transmitted through the transmission area 320 while a diameter of the blue wavelength range light Lb is narrowed when it passes through the excitation light optical path side collective lens 77 and the first collective lens group 111. Then, the blue wavelength range light Lb is caused to emerge towards a first reflection mirror 142. Blue wavelength range light Lb is collected in the transmission area 320 (or a position near a leading or trailing end of the transmission area 320), whereby an optical image is reverted about an optical axis of the luminescent wheel 101. The transmission area 320 of the luminescent wheel 101 constitutes an optical reference plane A (an optical reference point) of light incident on the microlens array 90, which will be described later (refer also to FIGS. 2 and 4).

When a shining area of blue wavelength range light Lb on the luminescent wheel 101 is the luminescent light emitting area 310, green wavelength range light Lg, which is excited by blue wavelength range light Lb, is emitted towards the first collective lens group 111. On the other hand, when the shining area of blue wavelength range light Lb on the luminescent wheel 101 is the transmission area 320, blue wavelength range light Lb emitted from the blue laser diode 71 passes through the luminescent wheel 101 and is then guided to the first reflection mirror 142.

The light collection optical system 140 includes multiple collective lenses for collecting lights in the red, green and blue wavelength ranges, multiple reflection mirrors and dichroic mirrors for changing axes of the lights in the red, green and blue wavelength ranges into an identical light axis, and the like. Specifically speaking, in the light collection optical system 140, a first dichroic mirror 141 is disposed in a position where blue wavelength range light Lb emitted from the excitation light shining device 70 and green wavelength range light Lg emitted from the luminescent wheel 101 intersect red wavelength range light Lr emitted from the red light source device 120. The first dichroic mirror 141 transmits blue wavelength range light Lb and red wavelength range light Lr and reflects green wavelength range light Lg. Thus, the direction of an axis of green wavelength range light Lg emitted from the luminescent wheel 101 is changed through 90 degrees in the direction of the left panel 15.

In addition, the first reflection mirror 142 is disposed to be placed on an axis of blue wavelength range light Lb that is transmitted or diffuse transmitted through the luminescent wheel 101, and this first reflection mirror 142 is configured to reflect blue wavelength range light Lb in such a manner as to change the direction of the axis of the blue wavelength range light Lb through 90 degrees in the direction of the left panel 15. The blue light optical path side collective lens 146, which is a double-convex lens, is disposed on a side of the first reflection mirror 142 which faces the left panel 15. Further, a second reflection mirror 143 is disposed on a side of the blue light optical path side collective lens 146 which faces the left panel 15. The first collective lens 147, which is a single-convex lens having a convex surface on an incident side thereof, is disposed on a side of the second reflection mirror 143 which faces the back panel 13. The second reflection mirror 143 changes the direction of the axis of the blue wavelength range light Lb which is collected at the blue light optical path side collective lens 146 through 90 degrees towards the back panel side 13 so as to cause the blue wavelength range light Lb to be incident on the first collective lens 147.

In addition, the second collective lens 148, which is a convex lens (a positive meniscus lens) having a convex surface on an entrance or incident side and a concave surface on an exit or emerging side thereof, is disposed on a side of the first dichroic mirror 141 which faces the left panel 15. Further, a second dichroic mirror 144 is disposed on a side of the second collective lens 148 which faces the left panel 15, which side constitutes a side of the first collective lens 147 which faces the back panel 13. The second dichroic mirror 144 reflects red wavelength range light Lr and green wavelength range light Lg in such a manner as to change the direction of axes of the red and green lights through 90 degrees towards the back panel 13.

The axis of red wavelength range light Lr that passes through the first dichroic mirror 141 and the axis of green wavelength range light Lg which is reflected by the first dichroic mirror 141 in such a manner as to coincide with the axis of the red wavelength range light Lr are incident on the second collective lens 148. Then, the red wavelength range light Lr and the green wavelength range light Lg, which have passed through the second collective lens 148, are reflected by the second dichroic mirror 144 to thereby be incident on the third collective lens 149. On the other hand, the blue wavelength range light Lb, which is collected at the first collective lens 147, passes through the second dichroic mirror 144 to thereby be incident on the third collective lens 149.

The third collective lens 149 is a convex lens (a positive meniscus lens) having a convex surface on an incident side and a concave surface on an emerging side thereof. The third collective lens 149 collects the red wavelength range light Lr, the green wavelength range light Lg, and the blue wavelength range Lb which are incident thereon from the second dichroic mirror 144 and emits them towards the third reflection mirror 145. Axes of light emitted from the third collective lens 149 are changed in direction towards the microlens array 90 by the third reflection mirror 145. In this embodiment, the third collective lens 149 has a convex surface provided on an incident surface side thereof to thereby cause light (collected light) for forming a substantially imaged or focused image F2, which will be described later, to be incident on the microlens array 90.

In this embodiment, since red wavelength range light Lr, green wavelength range light Lg, and blue wavelength range light Lb are caused to be incident on the second collective lens 148 and the third collective lens 149, which are both the positive meniscus lens, in any of optical paths, the lights so incident are collected in a short focal distance, whereby the aberration of the image F2 formed can be reduced compared with a case in which a planoconvex lens is used.

An optical path of light incident on the microlens array 90 is changed so as to convert the light into light of a uniform intensity distribution, and the resulting light is emitted towards a concave lens 181 (a display device 51). Optical paths formed before and after the microlens array 90 will also be described later on.

The light guiding optical system 180 includes the concave lens 181, a convex lens 182, a reflection mirror 183, and a condenser lens 184. The condenser lens 184 emits image light emitted from the display device 51, which is disposed on a side of the condenser lens 185 which faces the back panel 13, towards the projection optical system 220, and hence, the condenser lens 184 is also regarded as making up a part of the projection optical system 220. The concave lens 181 is disposed between the microlens array 90 and the convex lens 182 (in other words, the display device 51). The projection lens 182 is disposed between the concave lens 181 and the reflection mirror 183 (in other words, between the microlens array 90 and the display device 51).

Light emitted from the microlens array 90 is then incident on the concave lens 181, which is a double-concave lens, where the light is expanded in width, whereafter the light is incident on the convex lens 182. The convex lens 182 collects light emitted from the concave lens 181 and emits the light so collected to the reflection mirror 183. In this embodiment, the convex lens 182 is a double-convex lens, in which a curvature of a convex surface on an incident side is made larger than a curvature of a convex surface on an emerging side. Since the convex lens 182 is the double-convex lens, its focal distance becomes short, whereby the light can be shined on to an effective area of the display device 51 in a relatively short distance. Thus, an optical path length from the convex lens 182 to the display device 51 can be shortened, whereby the light source apparatus 60 can be reduced in size.

The light emitted from the projection lens 182 is reflected by the reflection mirror 183 and is then shined on to the display device 51 at a predetermined angle by way of the condenser lens 184. The display device 51 is a digital micromirror device (DMD), and a heat sink 190 is provided on a side of the display device 51 which faces the back panel 13, whereby the display device 51 is cooled by this heat sink 190.

Figure 4:
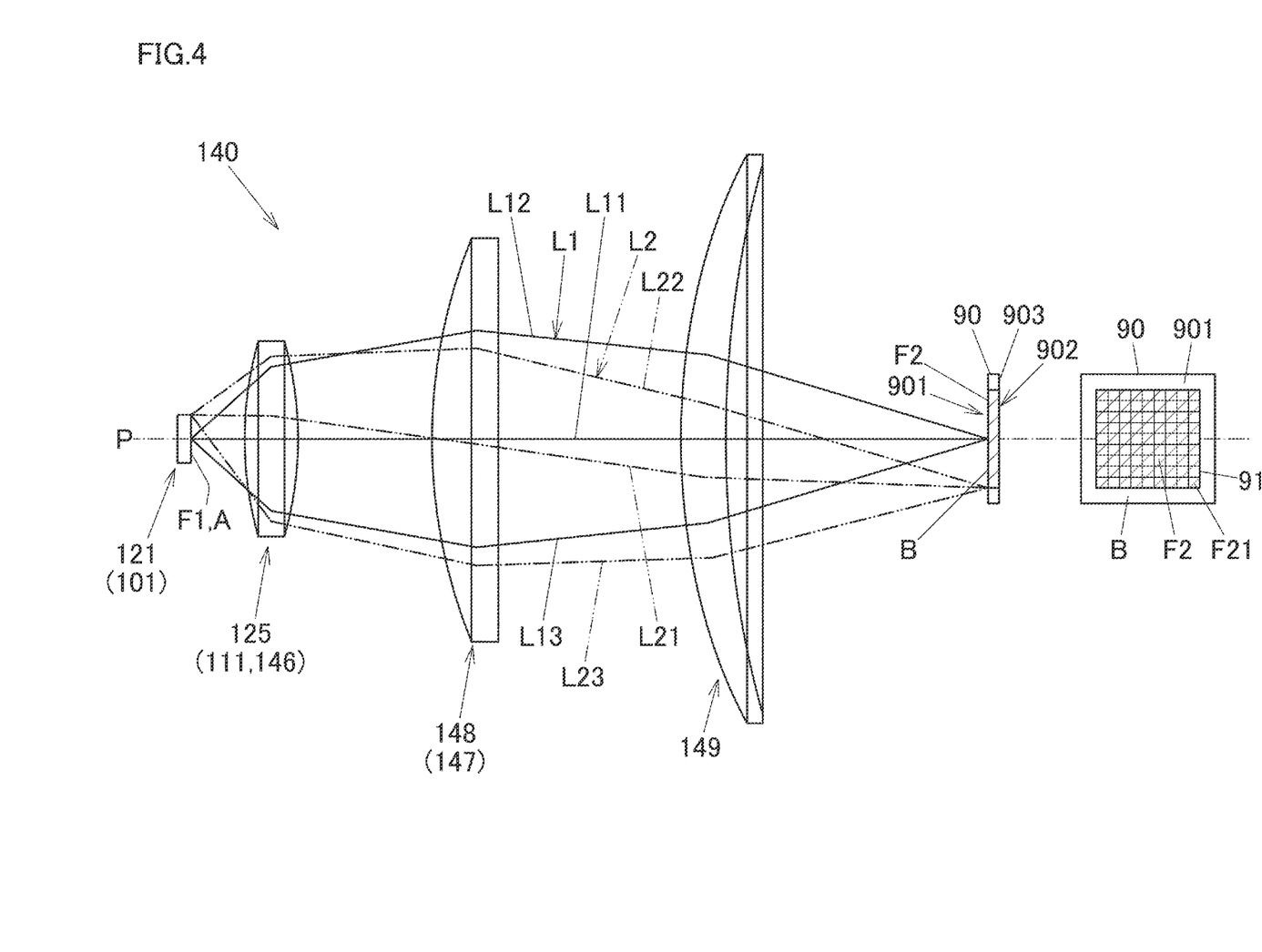
FIG. 4 is a diagram showing optical paths of lights that are incident on a microlens array according to the embodiment of the present invention.

Here, referring to schematic diagrams shown in FIGS. 4 to 6, optical paths from the light collection optical system 140 to the light guiding optical system 180, which are disposed before and after the microlens array 90, respectively, will be described. FIG. 4 shows schematically an optical reference plane A (an optical reference point) on an object side, the light collection optical system 140, and the microlens array 90. The microlens array 90 is shown both in a side view and a plan view. Lights L1, L2 exemplify optical paths of lights constituting a part of lights included in red wavelength range light Lr, green wavelength range light Lg or blue wavelength range light Lb. In FIG. 4, the light collection optical system 140 is shown only with the second collective lens group 125 (simplified into a single lens configuration), the second collective lens 148, and the third collective lens 149 which are disposed along an optical path of red wavelength range light Lr. In the case of the optical path of red wavelength range light Lr, the optical reference plane A is a light emitting plane (a light emitting point) of the red light emitting diode 121.

In addition, in the case of the optical path of green wavelength range light Lg, the optical reference plane A is a light emitting plane (a light emitting point) of the luminescent light emitting area 310 on the luminescent wheel 101, and the first collective lens group 111, the second collective lens 148, and the third collective lens 149 are disposed as the light collection optical system 140 (refer to parenthesized reference numerals in FIG. 4). In the case of the optical path of blue wavelength range light Lb, the optical reference plane A is a light emitting plane or a light collection plane (a light emitting point) of the transmission area 320 on the luminescent wheel 101 where lights in the blue wavelength range which are emitted from the multiple blue laser diodes 71 are collected (or substantially collected), and the blue light optical path side collective lens 146, the first collective lens 47, and the third collective lens 149 are disposed as the light collection optical system 140 (refer to parenthesized reference numerals in FIG. 4). In the description made by reference to FIG. 4, a light collection optical system 140 for the optical path of red wavelength range light Lr will be described.

Light emitted from the optical reference plane A is collected by the second collective lens group 125, the second collective lens 148, and the third collective lens 149 and is then incident on the microlens array 90 while the light is being narrowed in width. The light guiding optical system 180 shown in FIG. 2 is disposed in such a manner as to be positioned closer to the display device 51 than to an image forming plane B (an image forming point) of light collected by the light collection optical system 140. In this embodiment, an image forming plane B where an image F2 for the optical reference plane A is formed is disposed on an incident plane 901 of the microlens array 90 (also, refer to light L1 emitted from a center of the optical reference plane A where an optical axis P passes and light L2 emitted from a radially outer side of the optical reference plane A which is radially away from the optical axis P). Consequently, light formed into a similar shape for a light distribution on the optical reference plane A is incident on the microlens array 90. In the example shown in FIG. 4, an image F2 formed by red wavelength range light Lr that is incident on the microlens array 90 is formed as expanded wider than light F1 on the optical reference plane A.

As to the shape of the image F2, in the case of light in the red wavelength range, since the red light emitting diode 121 emits light from a substantially rectangular light emitting plane, the image F2 is formed into a substantially rectangular shape as shown in the plan view of the microlens array 90 in FIG. 4. On the other hand, although not shown, in the case of light in the blue wavelength range, since a cross-sectional shape of light on the optical reference plane A becomes substantially circular (or substantially elliptical), an image F2 formed on the image forming plane B also becomes substantially circular (or substantially elliptical). Further, in the case of light in the green wavelength range, in the luminescent light emitting area 310 which constitutes the optical reference plane A, since light is emitted from a substantially circular (or a substantially elliptical) light emitting plane, an image F2 formed on the image forming plane B also becomes substantially circular (or substantially elliptical).

Figure 5:
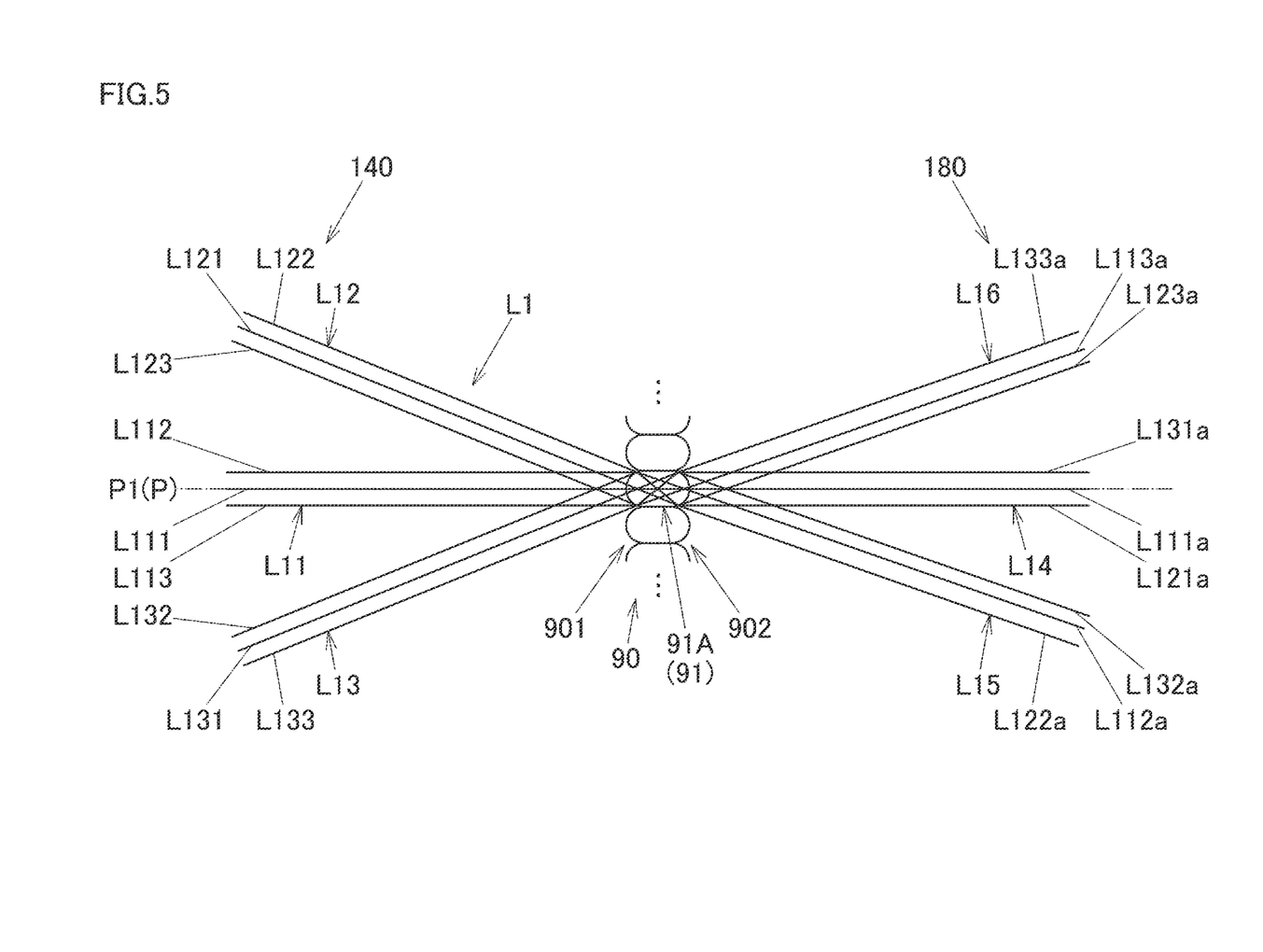
FIG. 5 is a diagram showing optical paths of lights before and after the microlens array according to the embodiment of the present invention.

The image forming plane B may be disposed on an emerging plane 902 or in a position between the incident plane 901 and the emerging plane 902 in addition to the incident plane 901 of the microlens array 90 (an incident plane of a microlens 91 shown in FIG. 5). The image forming plane B may also be positioned near the front or rear of the microlens array 90. Thus, the microlens array 90 can be configured so that light in which the optical reference plane A is substantially formed is incident on the microlens array 90.

FIG. 5 shows optical paths when light L1 is incident on an incident plane 901 of a microlens 91 positioned on the optical axis P of the light collection optical system 140. Multiple microlenses 91 making up the microlens array 90 are each a double-convex lens having a convexly curved surface on both an incident plane 901 and an emerging plane 902. An optical axis P1 of a central microlens 91A shown in FIG. 5 on which light L1 is incident coincides with the optical axis P of the light collection optical system 140. With the microlens array 90, an image F2 of the optical reference plane A can be shined on to the display device 51 in a superimposed fashion while being diffused for each partial area F21 (also, refer to the plan view of the microlens array 90 in FIG. 4) by a corresponding microlens 91. In addition, in this embodiment, the microlens array 90 is formed in a size corresponding to a collected diameter of light incident thereon from the light collection optical system 140. Consequently, the microlens array 90 can be configured with such a minimum size that light L2 that is emitted from a radially outer side of the optical reference plane A which is radially away from the optical axis P can be incident on the incident plane 901.

Light L1 is shown as including optical axis light L11 and marginal lights L12, L13. The optical axis light L11 and the marginal lights L12, L13 are each shown as parallel light that is incident on the convexly curved incident plane 901 of the central microlens 91A. The optical axis light L11 and the marginal lights L12, L13 include optical axis lights L111, L121, L131 and marginal lights L112, L122, L132, L113, L123, L133, respectively, which are incident on the incident plane 901 of the central microlens 91A.

The optical axis light L11 and the marginal lights L12, L13, which are incident from a side facing the light collection optical system 140, are collected on the incident plane 901 to thereby be incident on the central microlens 91A. The individual lights L11 to L13 are diffused in such a manner as to be superimposed one on another as lights L14 to L16 once the lights L11 to L13 emerge from the emerging plane 902 of the central microlens 91A.

The respective optical axis lights L111, L121, L131, which are components included in the optical axis light L11 and the marginal lights L12, L13, are emitted as optical axis light L111$a$ and marginal lights L121$a$, L131$a$, respectively, which constitute substantially parallel optical axis light L14. In addition, the marginal lights L112, L122, L132 are emitted as optical axis light L112$a$ and marginal lights L122$a$, L132$a$, respectively, which constitute substantially parallel marginal light L15. Further, the marginal lights L113, L123, L133 are emitted as optical axis light L113$a$ and marginal lights L123$a$, L133$a$, respectively, which constitute substantially parallel marginal light L16.

Although not shown in FIG. 5, optical paths of the light L2 shown in FIG. 4 will be similar to those of the light L1. As in the case with the light L1, the light L2 is incident on the microlens 91 and is then caused to be emitted from the emerging plane 902, and optical axis light and marginal lights, which are incident from the incident plane 901, are diffused in such a manner as to be superimposed one on another. Then, lights emitted from the individual microlenses 91 are also emitted in such a manner as to be superimposed one on another.

Figure 6:
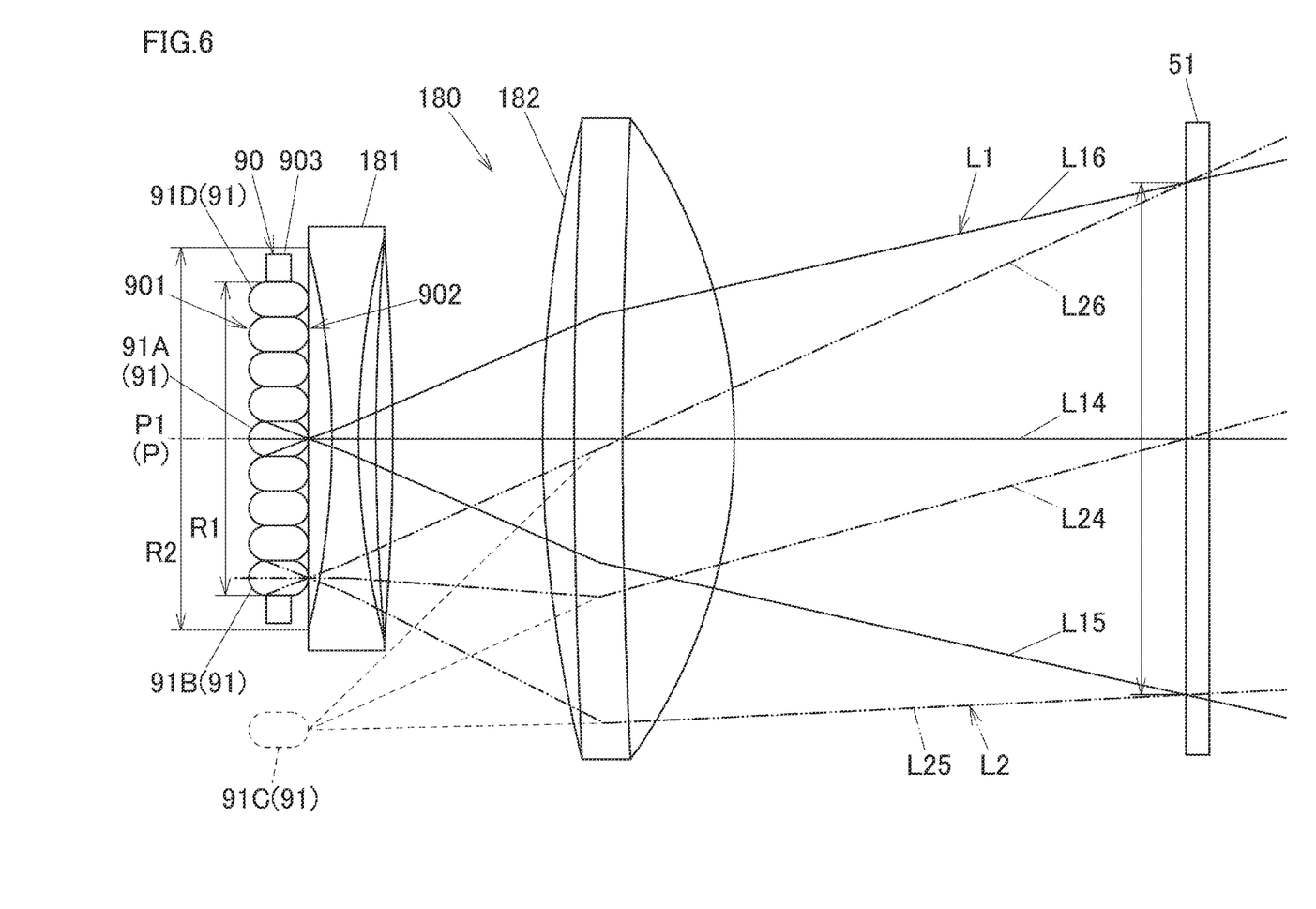
FIG. 6 is a diagram showing optical paths of lights emitted from the microlens array according to the embodiment of the present invention.

FIG. 6 schematically shows the microlens array 90, and the concave lens 181 and the convex lens 182 which are included in the light guiding optical system 180. As the optical paths are described in FIG. 5, the light L1 (the optical axis light L14 and the marginal lights L15, L16) which is emitted from the central microlens 91A is incident on the concave lens 181. The microlens array 90 and the concave lens 181 are disposed in contact with each other. For example, emerging planes 902 of the microlenses 91 of the microlens array 90 can be brought into abutment with an incident plane or an outer circumferential edge of the concave lens 181. Alternatively, an outer circumferential edge 903 of the microlens array 90 can be kept in abutment with the incident plane of the concave lens 181. In addition, an effective aperture R2 of the concave lens 181 is formed larger than an effective aperture R1 of the microlens array 90. The concave lens 181 diffuses the light L1 incident thereon (expands the width of the light) and emits the light L1 so diffused towards the projection lens 182. As to the light L2 shown in FIG. 4, the light L2 (optical axis light L24 and marginal lights L25, L26) emitted from a microlens 91B at a lower end side is incident on the concave lens 181. The concave lens 181 diffuses the light L2 incident thereon (expands the width of the light) and emits the light L2 so diffused towards the convex lens 182.

The convex lens 182 collects the light L1 that is incident thereon in such a manner that the width of the light is narrowed (collects the light L1 in such a manner that an inclination angle from the optical axis P becomes smaller) and emits the light L1 so narrowed towards the display device 51 in FIG. 2. In addition, the convex lens 182 collects the light L2 that is incident thereon and emits the light L2 so collected towards the display device 51 as with the light L1. Consequently, the lights L1, L2 that are to be incident on the display device 51 are shined on to the display device 51 with each being formed substantially into parallel light.

In this embodiment, the concave lens 181 configured to diffuse light is disposed between the microlens array 90 and the convex lens 182. Consequently, for example, the light L2 emitted from the microlens 91B at the lower end side can imitate light emitted from an imaginary microlens 91C which is positioned farther away from the optical axis P than the microlens 91B at the lower end side. Namely, even if the microlens array 90 is configured small in size, by disposing the concave lens 181 immediately after the microlens array 90 and disposing the convex lens 182 immediately after the concave lens 181, light is imaginarily caused to be incident on the convex lens 182 from a large microlens array, whereby light more uniform now than before it is incident on the microlens array 90 can be guided towards the display device 51.

The convex lens 182 is disposed at a predetermined interval from the concave lens 181. As a result, since light emitted from the concave lens 181 can be collected by the convex lens 182 after the light is expanded in width to some extent, the light to be shined on to the display device 51 can be caused to be incident thereon while being formed substantially into parallel light. In addition, the marginal light (for example, the marginal light L25) emitted from the concave lens 181 can be taken into the convex lens 182 to thereby improve the light utilization efficiency. Further, since the light close to parallel light is caused to be incident on the display device 51, a reduction in the light utilization efficiency due to the occurrence of stray light can also be reduced even in the vicinity of the display device 51.

Returning to FIG. 2, light, which is light source light shined on to an image forming plane of the display device 51, is reflected by the image forming plane of the display device 51 and is then projected on to a screen by way of the projection optical system 220 as projected light. Here, the projection optical system 220 is made up of the condenser lens 184, the movable lens group 235, and a fixed lens group 225. The movable lens group 235 is configured so as to move by being driven by the lens motor 45. Then, the movable lens group 235 and the fixed lens group 225 are incorporated in a fixed lens barrel. Thus, the fixed lens barrel including the movable lens group 235 is made into a variable-focus lens which can enable zooming and focusing controls.

With the projector 10 configured in the way described heretofore, when the luminescent wheel 101 is rotated and lights are caused to be emitted from the excitation light shining device 70 and the red light source device 120 at different timings, since light in the red wavelength range, light in the green wavelength range, and light in the blue wavelength range are incident on the display device 51 by way of the light collection optical system 140 and the light guiding optical system 180, DMD, which is the display device 51 of the projector 10, displays red, green and blue lights in a time-sharing fashion in accordance with the data, thereby making it possible to project a color image on to the screen.

Next, referring to FIGS. 7A to 7C, Modified Example 1 to Modified Example 3 will be described. The light source apparatus 60 described heretofore is described as including the concave lens 181 disposed immediately after the microlens array 90 and the convex lens 182 disposed immediately after the concave lens 181, however, the arrangement of the microlens array 90, the concave lens 181, and the convex lens 182 can be modified as required as will be exemplified as below.

Figure 7A:
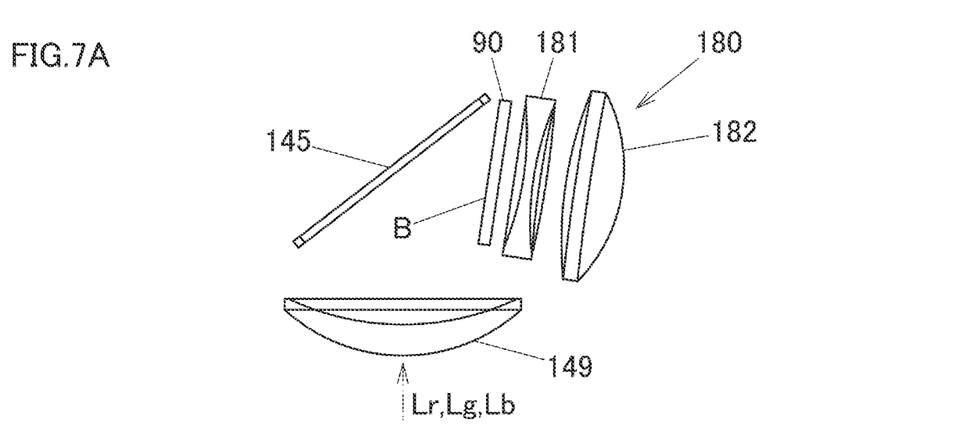

In the light source apparatus 60 according to Modified Example 1 shown in FIG. 7A, the microlens array 90 and the concave lens 181 are disposed spaced apart from each other so as not to come into contact with each other. For example, the concave lens 181 can be positioned relatively far apart from the microlens array 90 so as to be disposed relatively closer to the convex lens 182. In this case, an outside diameter (a beam diameter) of light incident on the convex lens 182 (in FIG. 6, lights falling within a width ranging from the outer marginal light L25 emitted from the microlens 91B at the lower end side to outer marginal light (not shown) emitted from a microlens array 91D at an upper end side) can be made small. The outside diameter of the light incident on the convex lens 182 can be set based on a distance from the convex lens 182 to the display device 51 or the size of an effective area of the display device 51 where micromirrors thereof are disposed. For example, since with the configuration of Modified Example 1, light which is substantially parallel and uniform and in which the outside diameter of the light is small compared with the light provided by the configuration of the projector 10 shown in FIG. 2 can be shined on to the display device 51, the configuration of Modified Example 1 can also be applied to a case in which the effective area of the display device 51 is small.

Figure 7B:
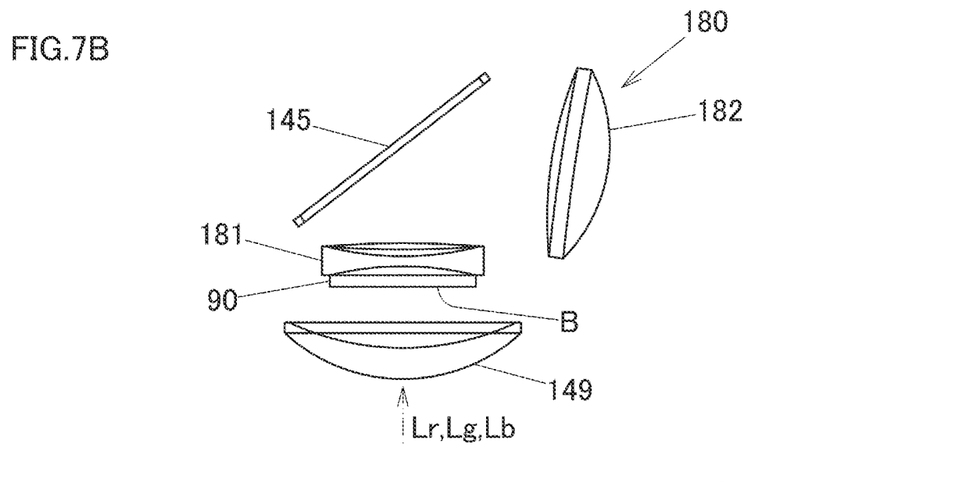

In the light source apparatus 60 according to Modified Example 2 shown in FIG. 7B, the microlens array 90 and the concave lens 181 are disposed between the third collective lens 149 and the third reflection mirror 145. Thus, light collected by the third collective lens 149 is incident on the microlens array 90 and the concave lens 181. Thereafter, the light is reflected by the third reflection mirror 145 and is then incident on the convex lens 182. In FIG. 7B, although the microlens array 90 and the concave lens 181 are shown as being brought into contact with each other, as with Modified Example 1, the microlens array 90 and the concave lens 181 may be disposed spaced apart from each other so as not to come into contact with each other.

With Modified Example 2, since the distance from the concave lens 181 to the convex lens 182 can be made long, the outside diameter of light incident on the convex lens 182 can be made large. For example, since with the configuration of Modified Example 2, light which is substantially parallel and uniform and in which the outside diameter of the light is large compared with the light provided by the configuration of the projector 10 shown in FIG. 2 can be shined on to the display device 51, the configuration of Modified Example 2 can also be applied to a case in which the effective area of the display device 51 is large.

Figure 7C:
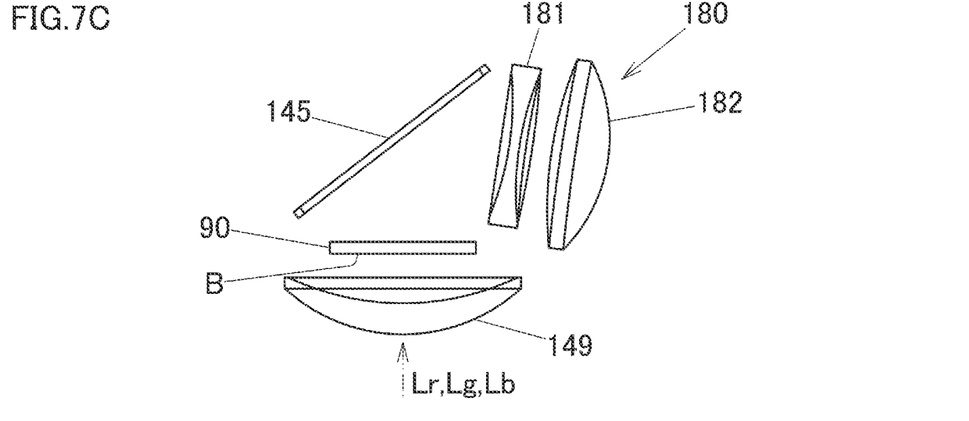

In the light source apparatus 60 according to Modified Example 3 shown in FIG. 7C, the microlens array 90 is disposed between the third collective lens 149 and the third reflection mirror 145. Consequently, light collected by the third collective lens 149 is incident on the microlens array 90 and is then reflected by the third reflection mirror 145, whereby the light is incident on the concave lens 181 and the convex lens 182.

Since with Modified Example 3, the distance from the microlens array 90 to the concave lens 181 can be made longer, even in the case that the effective aperture R1 (refer to FIG. 6) of the microlens array 90 is small, emitted light from the microlens array 90 can be caused to be incident on the concave lens 181 while the outside diameter of the light thereof is increased. As a result, since the outside diameter of the light diffused by the concave lens 181 is increased, the convex lens 182 can cause light which is substantially parallel and uniform and in which the outside diameter of the light is large to be incident on the display device 51. For example, the configuration of Modified Example 3 can also be applied to a case in which the effective area of the display device 51 is large. A focal distance of each of the microlenses 91 of the microlens array 90 can be set so that marginal light (for example, the marginal light L25 in FIG. 6) of light emitted from the microlens array 90 is allowed to be incident on or fall within the effective aperture R2 (refer to FIG. 6) of the concave lens 181.

Thus, the configurations of the embodiment of the present invention have been described by reference to FIGS. 1 to 7, however, other configurations, which will be described as below, can also be adopted. For example, a configuration may be adopted in which the light guiding optical system 180 is disposed between the microlens array 90 and the display device 51 depending on a configuration in which the size of the light or the lengths of the optical paths are configured differently, so that the concave lens 181 or the convex lens 182 is omitted. For example, in a case that a distance between the microlens array 90 and the display device 51 is relatively short, light emitted from the concave lens 181 can be shined directly (or by way of only the condenser lens 184 and the reflection mirror 183) on to the display device 51. The light source apparatus 60 can also adopt a configuration in which the concave lens 181 is not provided between the microlens array 90 and the convex lens 182 but is provided between the convex lens 182 and the display device 51 or a configuration in which the convex lens 182 is not provided between the concave lens 181 and the reflection mirror 183 but is provided between the reflection mirror 183 and the condenser lens 184.

The microlens 91 is not limited to the double-convex lens, and hence, a single-convex lens may be adopted for the microlens 91 by making flat the side where the incident plane 901 is formed or the other side where the emerging plane 902 is formed.

Figure 8:
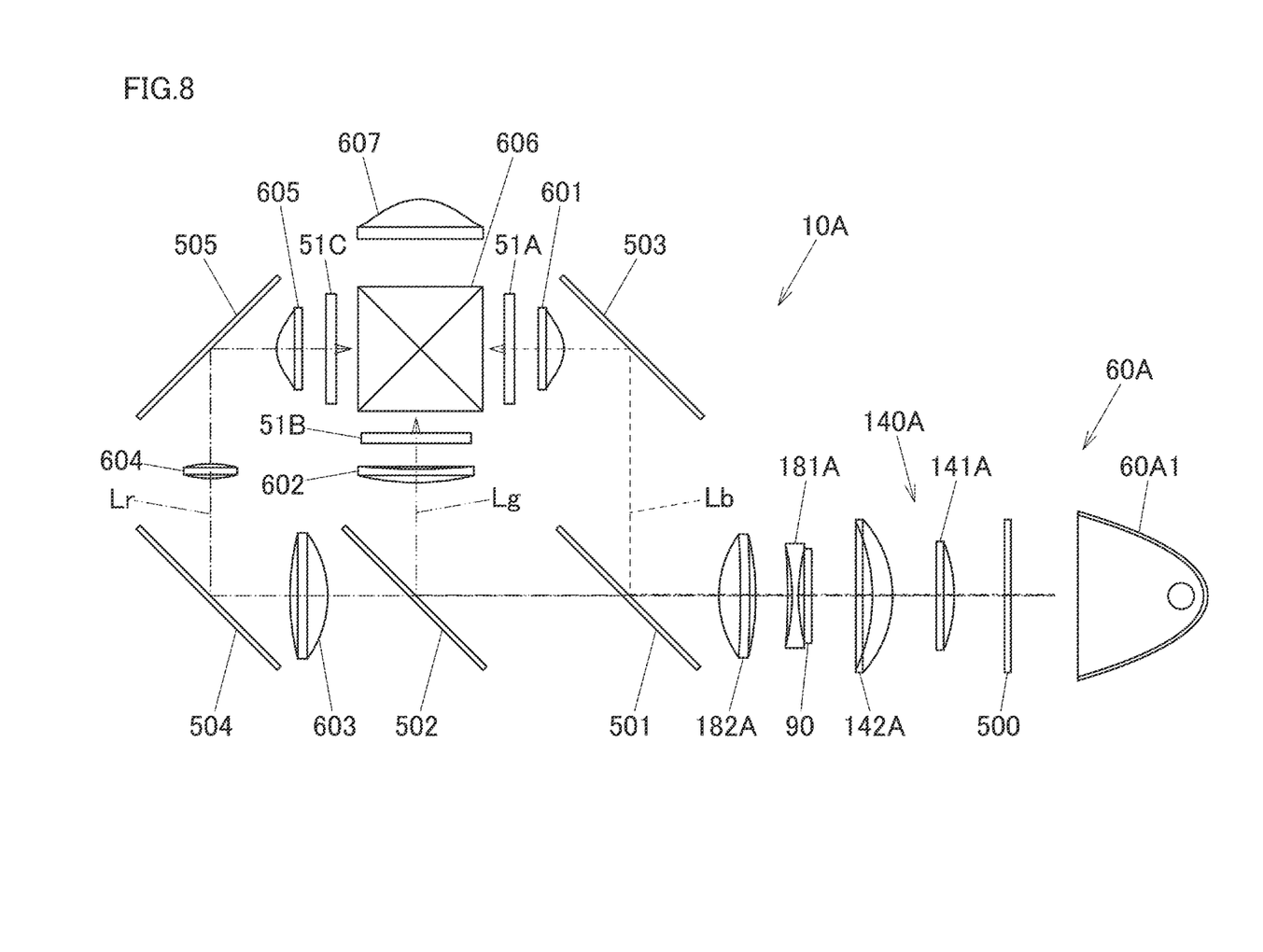
FIG. 8 is a diagram showing an example in which the microlens array according to the embodiment of the present invention is applied to an LCD projector.

In this embodiment, while the configuration is described in which light is caused to be incident on the microlens array 90 so as to be made uniform in light intensity distribution in the projector 10 adopting a Digital Light processing (DPL) method, the configuration described in this embodiment can also be applied to a projector 10A adopting a so-called Liquid Crystal Display (LCD) method as shown in FIG. 8. In this case, a microlens array 90 can adopt a similar configuration to that of the microlens array 90 provided in the projector 10 shown in FIG. 2 and the like.

For example, a light source apparatus 60A includes a lamp light source 60A1 having a cold mirror configured to transmit light (for example, white light) in a visible light range including red wavelength range light Lr, green wavelength range light Lg, and blue wavelength range light Lb. The lamp light source 60A1 emits light to a light collection optical system 140A disposed in front thereof. The light collection optical system 140A includes a visible light filter 500 configured to cut off light in the ultraviolet and infrared wavelength ranges, a first collective lens 141A and a second collective lens 142A and guides light in the visible light range emitted from the lamp light source 60A to a microlens array 90 while collecting the light. The light collection optical system 140A may include a reflection mirror so as to change the direction of an axis of light along an optical path thereof. The shapes and numbers of collective lenses (including convex lenses and concave lenses) that are disposed in the light collection optical system 140A may be changed depending on optical path lengths or light guiding routes within the projector 10A.

In addition, a concave lens 181A and a convex lens 182A are disposed on an emerging side of the microlens array 90 and between the microlens array 90 and a display device (a blue liquid crystal filter 51A, a green liquid crystal filter 51B, and a red liquid crystal filter 51C). As with the projector 10 shown in FIG. 2, the concave lens 181A is disposed immediately after the microlens array 90. In addition, the convex lens 182A is disposed immediately after the concave lens 181A. Light emitted from the microlens array 90 is controlled in collected light diameter by the concave lens 181A and the convex lens 182A and is then guided to a blue light separation dichroic mirror 501.

The microlens array 90 is formed in a size corresponding to a collected light diameter of light which is collected by the light collection optical system 140A and which is incident thereon from the light collection optical system 140A. Then, the light shined on to the microlens array 90 is diffused at each partial area and is then guided to a light separation section (including a blue light separation dichroic mirror 501 and a green light separation dichroic mirror 502) that is provided between the microlens array 90 and the display device (the blue liquid crystal filter 51A, the green liquid crystal filter 51B, and the red liquid crystal filter 51C). The light emitted from the microlens array 90 is separated into lights of predetermined colors by the light separation section, and thereafter, the lights of predetermined colors are shined on to image forming planes of multiple corresponding liquid crystal filters in such a manner as to properly fall on the corresponding image forming planes.

Specifically speaking, the blue light separation dichroic mirror 501 reflects blue wavelength range light Lb in light emitted from the microlens array 90 and transmits green wavelength range light Lg and red wavelength range light Lr. Blue wavelength range light Lb, which is guided by the blue light separation dichroic mirror 501, is reflected by a first total reflection mirror 503 and is then collected by a first condenser lens 601, whereafter the blue wavelength range light Lb is incident on the blue liquid crystal filter 51A. The blue liquid crystal filter 51A forms image light corresponding to blue in image data and causes the image light so formed to be incident on a dichroic prism 606.

Green wavelength range light Lg and red wavelength range light Lr are guided to the green light separation dichroic mirror 502 after they have passed through the blue light separation dichroic mirror 501. The green light separation dichroic mirror 502 reflects green wavelength range light Lg and transmits red wavelength range light Lr. The green wavelength range light Lg, which is guided by the green light separation dichroic mirror 502, is collected by a second condenser lens 602 and is then incident on the green liquid crystal filter 51B. The green liquid crystal filter 51B forms image light corresponding to green in the image data and causes the image light so formed to be incident on the dichroic prism 606.

The red wavelength range light Lr, which has passed through the green light separation dichroic mirror 502, is reflected by a second total reflection mirror 504 and a third total reflection mirror 505 and is then caused to be incident on a third condenser lens 605. In addition, the red wavelength range light Lr is guided while being collected by a first relay lens 603, which is a convex lens disposed between the green light separation dichroic mirror 502 and the second total reflection mirror 504, and a second relay lens 604, which is a convex lens disposed between the second total reflection mirror 504 and the third total reflection mirror 505. The red wavelength range light Lr guided from the third total reflection mirror 505 is collected by the third condenser lens 605 and is then incident on the red liquid crystal filter 51C. The red liquid crystal filter 51C forms image light corresponding to red in the image data and causes the image light so formed to be incident on the dichroic prism 606.

The dichroic prism 606 reflects blue wavelength range light Lb and red wavelength range light Lr and transmits green wavelength range light Lg so as to combine those blue, red and green wavelength range lights together on to the same optical path, causing them to be incident on a projection-side lens 607 as image light. The image light is then projected on to a screen or the like by way of the projection-side lens 607.

With the light source apparatus 60A configured as has been described heretofore, the microlens array 90 is disposed on a side, which faces the lamp light source 60A1, of the liquid crystal filters (the liquid crystal panels) which are the display devices disposed at the three locations, so that the blue, green and red lights which are made uniform in light intensity distribution by the microlens array 90 can be incident on the corresponding liquid crystal filters. In addition, an optical element such as a concave lens, a convex lens or the like may be disposed further as required between the microlens array 90 and the liquid crystal filters, irrespective of the configuration shown in FIG. 8.

In the embodiment, the light source apparatuses 60, 60A and the projectors 10, 10A are described, the light source apparatuses 60, 60A being described as including the light collection optical system 140 for collecting light emitted from the light sources by the multiple lenses, the microlens array 90 that is formed in the size corresponding to the collected light diameter of the light collected by the light collection optical system 140 and caused to be incident from the light collection optical system 140, and the display device 51 on to which lights which are transmitted through the microlens array 90 so as to be superimposed one on another are shined. With this configuration, the microlens array 90 can be reduced in size in accordance with the collected light diameter of the light that is incident thereon, whereby the optical system including the microlens array 90 can be made small in size. Consequently, the light source apparatuses 60, 60A can be made small in size, and hence, the projectors 10, 10A can also be made small in size as a whole. Namely, although with the projector according to JP-A-2000-98488, the lens array is made larger in size, leading to a possibility that the area occupied by the optical system is made large in size in the projector, with the configuration according to the present invention, since the optical system can be made small in size, the whole of the projector 10 can also be made small in size.

In addition, the light source apparatus 60 is described as including only one microlens array 90. In the configuration according to the related art, the two microlens arrays 90 need to be disposed at the predetermined interval in consideration of the focal distance. However, by using the configuration of the embodiment of the present invention, there is necessary only one microlens array 90, whereby the optical system in the projector 10 can be made small in size.

With the light source apparatus 60 in which the concave lens 181 is disposed between the microlens array 90 and the display device 51, even though the outside diameter of the light emitted from the microlens array 90 is small, the light can be shined on to the display device 51 by increasing the outside diameter of the light so as to match it with the effective shining diameter of the display device 51. Consequently, the microlens array 90 can be made small in size.

With the light source apparatus 60 in which the convex lens 182 is disposed between the microlens array 90 and the display device 51, light to be shined on to the display device 51 is collected in such a manner as to become close to parallel light so as to reduce the occurrence of stray light in the display device 51, thereby making it possible to improve the light utilization efficiency.

With the light source apparatus 60 including the concave lens 181 which is disposed immediately after the microlens array 90 between the microlens array 90 and the display device 51 and the convex lens 182 which is disposed after the concave lens 181, even though the outside diameter of the light emitted from the microlens array 90 is small, light to be shined on to the display device 51 can be made close to parallel light by increasing the outside diameter of the light so as to match it with the effective shining diameter of the display device 51. Consequently, the microlens array 90 can be configured small in size while improving the light utilization efficiency of the display device 51.

With the light source apparatus 60 in which the convex lens 182 is disposed in the position where the convex lens 182 can enable marginal light of light emitted from the concave lens 181 to be incident thereon, the utilization efficiency of lights emitted from the light sources can be improved.

In addition, with the light source apparatus 60 in which the microlens array 90 and the concave lens 181 are disposed in contact with each other, and the effective aperture R2 of the concave lens 181 is larger than the effective aperture R1 of the microlens array 90, marginal light of light emitted from the microlens array 90 can be taken into the concave lens 181 in an ensured fashion while decreasing the size of the area occupied by the optical system disposed after the microlens array 90. Consequently, the utilization efficiency of light shined on to the display device 51 can be improved.

The microlens array 90 is disposed in the position where light emitted from the light collection optical system 140 substantially forms an image. As a result, since light can be caused to be incident on the microlens array 90 in the position where the collected light diameter thereof is made small, the effective aperture R1 of the microlens array 90 can be made small, whereby the microlens array 90 can be made small in size. As a result, the microlens array 90 can be configured inexpensively, and the whole optical system of the light source apparatus 60 can also be configured small in size.

With the light source apparatus 60 in which light to be incident on the microlens array 90 is so incident while its collected light diameter is being narrowed, the effective aperture R1 of the microlens array 90 is made smaller than an effective aperture of the lens disposed further rearwards in the light collection optical system 140 (the third collective lens 149 in the embodiment), whereby the whole of the microlens array 90 can be made small in size.

With the light source apparatus 60 in which each of the microlenses 91 making up the microlens array 90 is the double-convex lens, since the focal distance of the microlens 91 can be made short, and light which is made uniform in light intensity distribution by superimposing lights incident on the individual partial areas F21 can be emitted by the single member, the configuration on the periphery of the microlens array 90 can also be made small in size.

The light collection optical system 140 includes the first collective lens 147 having the convex surface on the incident side and the flat surface on the emerging side thereof or the second collective lens 148 having the convex surface on the incident side and the concave surface on the emerging side thereof and the third collective lens 149 on which light emitted from the first collective lens 147 or the second collective les 148 is incident and having the convex surface on the incident side and the concave surface on the emerging side thereof, and light emitted from the third collective lens 149 is incident on the microlens array 90. Lights (red wavelength range light Lr, green wavelength range light Lg, and blue wavelength range light Lb) that are emitted from the light sources are collected by the multiple lenses, as a result of which the collected light diameter of the light that is incident on the microlens array 90 can be reduced.

With the light source apparatuses 60, 60A in which the microlens array 90 distributes lights incident thereon from the light collection optical systems 140, 140A to the individual partial areas, even though the light intensity distribution of light incident on the microlens array is not uniform, the light can be made uniform in light intensity distribution when the light is emitted from the microlens array.

In the configuration according to the embodiment, the light separation section configured to separate lights emitted from the microlens array 90 by color is provided between the microlens array 90 and the display device (51A, 51B, 51C), and the display device (51A, 51B, 51C) includes the multiple liquid crystal filters (51A, 51B 51C) corresponding to the colors of the lights separated by the light separation section and on to which the lights so separated are shined. As a result, the microlens array 90 illustrated in the embodiment can be applied to the LCD light source apparatus 60A or projector, whereby the optical system or the entire projector can be made in size.

In the configuration according to the embodiment, the display device 51 is described as constituting the mirror device configured to form image light by causing the multiple micromirrors to reflect light incident thereon. As a result, colored lights of different wavelengths (red wavelength range light Lr, green wavelength range light Lg, and blue wavelength range light Lb) that are guided through the same optical path can be guided to the display device 51, whereby the configuration in the vicinity of the display device 51 can be made small in size.

The light source control method is described in which in the light source apparatus 60 of the embodiment, the processor 38 causes light emitted from the light sources to be collected by the multiple lenses (the first collective lens group 111 and the second collective lens group 125, as well as the blue light optical path side collective lens 146, the first collective lens 147, the second collective lens 148, and the third collective lens 149) of the light correction optical system 140 and causes the light which is transmitted through the microlens array 90 to be superimposed one on another to be shined on to the display device 51. As a result, the microlens array 90 can be made small in size in accordance with the collected light diameter of the light that is incident thereon, whereby the optical system including the microlens array 90 can be made small in size. As a result, not only the light source apparatus 60 but also the entire projector 10 can be made small in size.

The embodiment described heretofore is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A light source apparatus comprising:
a light source;
at least one lens configured to collect light emitted from the light source;
a microlens array formed into a size corresponding to a collected light diameter of the light collected by the at least one lens and caused to be incident thereon from the at least one lens; and
a display device on which light transmitted through the microlens array to be superimposed together is incident;
wherein the at least one lens comprise a third collective lens having a convex surface on an incident side and a concave surface on an emerging side thereof.

2. The light source apparatus according to claim 1, wherein the at least one lens comprises a first collective lens having a convex surface on an incident side and a flat surface on an emerging side thereof or a second collective lens having a convex surface on an incident side and a concave surface on an emerging side thereof, wherein the light emitted from the first collective lens or the light emitted from the second collective lens is incident on the third collective lens.

3. The light source apparatus according to claim 1, wherein the light emitted from the third collective lens is incident on the microlens array.

4. The light source apparatus according to claim 1, wherein the microlens array is disposed only one.

5. The light source apparatus according to claim 1,
wherein a concave lens is disposed between the microlens array and the display device.

6. The light source apparatus according to claim 1,
wherein a convex lens is disposed between the microlens array and the display device.

7. The light source apparatus according to claim 1, comprising:
a concave lens and a convex lens between the microlens array and the display device,
wherein the concave lens is disposed after the microlens array, and the convex lens is disposed after the concave lens.

8. The light source apparatus according to claim 7,
wherein the convex lens is disposed in a position where marginal light of light emitted from the concave lens can be incident on the convex lens.

9. The light source apparatus according to claim 5,
wherein an effective aperture of the concave lens is larger than an effective aperture of the microlens array.

10. The light source apparatus according to claim 1,
wherein the microlens array is disposed in a position where the light emitted from the at least one lens substantially forms an image.

11. The light source apparatus according to claim 10,
wherein the light incident on the microlens array is incident on the microlens array while narrowing the collected light diameter.

12. The light source apparatus according to claim 1,
wherein the microlens array distributes the light incident thereon from the at least one lens to a corresponding partial area of the microlens array.

13. The light source apparatus according to claim 1,
wherein a light separation section configured to separate light emitted from the microlens array by color is provided between the microlens array and the display device, and
wherein the display device comprises multiple liquid crystal filters corresponding to colors of lights separated by the light separation section and be incident thereon.

14. The light source apparatus according to claim 5,
wherein the concave lens is a double-concave lens.

15. The light source apparatus according to claim 6,
wherein the convex lens is formed as a double-convex lens, and a curvature of a convex surface on an emerging side is made larger than a curvature of a convex surface on an incident side.

16. The light source apparatus according to claim 7,
wherein the convex lens is formed as a double-convex lens, and a curvature of a convex surface on an emerging side is made larger than a curvature of a convex surface on an incident side.

17. The light source apparatus according to claim 1, comprising:
a convex lens and a concave lens between the microlens array and the display device,
wherein the convex lens is disposed after the microlens array, and the concave lens is disposed after the convex lens.

18. The light source apparatus according to claim 1, comprising:
wherein each microlens of the microlens array is a single-convex lens having a flat surfaces on an incident side thereof or a flat surface on an emerging side thereof.

19. A projector comprising:
a light source;
at least one lens configured to collect light emitted from the light source;
a microlens array formed into a size corresponding to a collected light diameter of the light collected by the at least one lens and caused to be incident thereon from the at least one lens;
a display device on which light transmitted through the microlens array to be superimposed together is incident;
a projection optical system configured to project the image light; and
a control unit configured to control the light source and the display device,
wherein the at least one lens comprises a first collective lens having a convex surface on an incident side and a flat surface on an emerging side thereof, or a second collective lens having a convex surface on an incident side and a concave surface on an emerging side thereof, and a third collective lens having a convex surface on an incident side and a concave surface on an emerging side thereof, wherein the light emitted from the first collective lens or the second collective lens is incident on the incident side of the third collective lens,
wherein the light emitted from the third collective lens is incident on the microlens array.

20. A light source control method for a light source apparatus comprising a light source, at least one lens, a microlens array formed into a size corresponding to a collected light diameter of light collected by the at least one lens and caused to be incident thereon from the at least one lens, a display device, and a control unit configured to control the light source and the display device, wherein the at least one lens comprises a first collective lens having a convex surface on an incident side and a flat surface on an emerging side thereof, or a second collective lens having a convex surface on an incident side and a concave surface on an emerging side thereof, and a third collective lens having a convex surface on an incident side and a concave surface on an emerging side thereof, wherein the light emitted from the first collective lens or the second collective lens is incident on the incident side of the third collective lens,
wherein the control unit causes the at least one lens to collect the light emitted from the light source, causes the light which was emitted from the third collective lens to incident on the microlens array, and causes the light superimposed together by transmission via the microlens array to be shined on the display device.

* * * * *